United States Patent [19]

Topper et al.

[11] Patent Number: 4,679,084

[45] Date of Patent: Jul. 7, 1987

[54] METHOD AND APPARATUS FOR FREEZING A TELEVISION PICTURE

[75] Inventors: Robert J. Topper, Hatboro, Pa.; Robert A. Dischert, Burlington, N.J.

[73] Assignee: RCA Corporation, Princeton, N.J.

[21] Appl. No.: 876,432

[22] Filed: Jun. 20, 1986

[51] Int. Cl.⁴ .............................................. H04N 5/14
[52] U.S. Cl. .................................. 358/160; 358/105; 358/136; 358/140
[58] Field of Search ................. 358/11, 12, 21 R, 105, 358/135, 22, 136, 140, 141, 160

[56] References Cited

U.S. PATENT DOCUMENTS

| | | |
|---|---|---|
| 4,272,787 | 6/1981 | Michael et al. ...................... 358/160 |
| 4,383,272 | 5/1983 | Netravali et al. .................... 358/136 |
| 4,400,719 | 8/1983 | Powers ............................... 358/21 R |
| 4,602,275 | 7/1986 | Smith et al. .......................... 358/11 |
| 4,612,567 | 9/1986 | Pritchard ............................ 358/105 |

Primary Examiner—James J. Groody
Assistant Examiner—Michael D. Parker
Attorney, Agent, or Firm—Paul J. Rasmussen; Eric P. Herrmann; David N. Caracappa

[57] ABSTRACT

Method and apparatus for producing a frozen television picture are disclosed. Successive fields of picture information are generated by an interpolator which is responsive to a video input signal. These successive fields are applied to the input of a first field store device. The video input signal is applied to the input of a second field store device so that the successive fields of the video input signal correspond in time to the successive fields generated by the interpolator. Lines from the respective field store devices are sequenced repetitively to form a video signal representing the frozen television picture. The interpolator generates fields which, when displayed with corresponding fields of the video input signal, minimizes motion-induced artifacts without unduly degrading vertical resolution.

6 Claims, 3 Drawing Figures

METHOD AND APPARATUS FOR FREEZING A TELEVISION PICTURE

The present invention relates to a method and apparatus which may be used for freezing a television picture of a scene which originally contained moving portions.

It is sometimes desirable to freeze the motion in a television picture to produce a still picture. A frozen picture, for example, may be transmitted over a narrow bandwidth channel to a remote location, or a particular moment in a sequence of action being transmitted by the television signal may be frozen in the receiver so that it may be studied in more depth.

Prior apparatus which is capable of freezing a moving television picture usually consists of a field or a frame store into which the television information is entered and from which the same information is retrieved for subsequent transmission or display. The television picture is frozen by inhibiting the writing process so that the data contained within the store at the time writing was inhibited is repetitively read for subsequent transmission or display.

If the store comprises a single field store, then this field may be repeated in an interlaced manner to produce the frame of information which is transmitted or displayed. If the store comprises a frame store, it is necessary to modify the read operation during a freeze he read operation during a freeze operation because, during the writing process that proceeded the freeze operation, there may be some scene content changes between the two fields, due to motion.

If the stored frame were repeatedly read out to form the video signal representing the frozen scene, some flicker would occur due to the motion. Movement flicker may be inhibited by using only one of the two fields. The main disadvantage of such a solution is the reduction in vertical resolution because using a single field effectively halves the vertical bandwidth. It is desirable to produce a frozen picture which provides full vertical resolution without introducing motion artifacts.

In accordance with the principles of the present invention, successive fields of television video information are generated by an interpolator responsive to a video input signal. These successive fields are applied to the input of a first field store device. Successive fields of the video input signal are applied to the input of a second field store device, so that they correspond in time to those generated by the interpolator. Lines from these respective field store devices are sequenced repetitively to produce a video signal representing the frozen television picture. The interpolator produces successive fields which, when displayed with corresponding video input signal fields, minimize motion-induced artifacts without unduly degrading vertical resolution.

Figure 1:
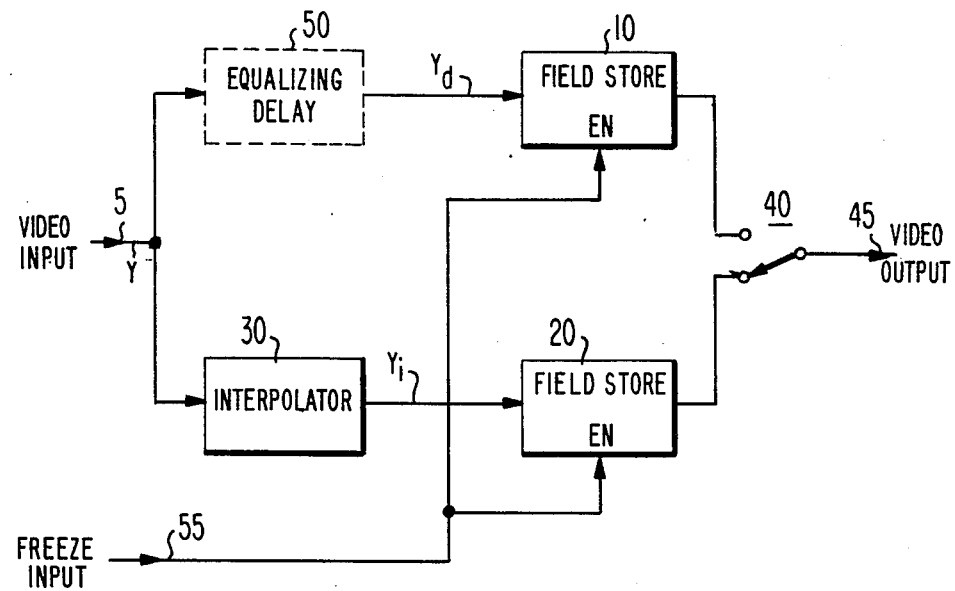
FIG. 1 illustrates apparatus embodying the principles of the present invention.

In FIG. 1, a video input terminal 5 is coupled to a source (not shown) of at least one component of a composite video signal, e.g. the luminance component Y. The video input terminal 5 is coupled to input ports of a first field store 10 and an interpolator 30. The output port of interpolator 30 is coupled to an input port of another field store 20. The output ports of field stores 10 and 20 are coupled to respective terminals of a sequencing unit 40, illustrated in FIG. 1 as a single-pole double-throw switch. The pole of switch 40 is coupled to a video output terminal 45. A freeze input terminal 55 is coupled a source (not shown) of a signal which is generated when it is desired to produce a frozen picture. This signal may, for example, be generated by a switch which is activated under user control when it is desired to freeze the television picture. The freeze signal input terminal 55 is coupled to enable input terminals on both field stores 10 and 20.

In operation, interpolator 30 generates a signal Yi representing successive fields of picture information from the video input signal Y. When the interpolated fields are displayed with corresponding fields of the video input signal, a picture is produced in which motion artifacts are minimized without unduly reducing vertical resolution. Such an interpolator is described in detail below.

When an enable signal is received at the freeze input signal terminal 55, field stores 10 and 20 each store a field of information and begin to repetitively produce the stored field at their output ports. Field store 10 at this time will hold a given television picture field and field store 20 will hold an interpolated picture field which corresponds to the given television picture field. In order that corresponding fields are available at the input ports of both field stores 10 and 20 simultaneously, an equalizing delay element 50, which generates a delayed luminance signal Yd, may be required between the video input terminal 5 and the input port of field store 10 as illustrated in phantom. The delay introduced by equalizing delay 50 will be equal to the delay introduced by interpolator 30 between the video signal input port 5 and the field store 20.

When a frame of television picture information is stored collectively in field stores 10 and 20, the information from the given television picture field and the interpolated television picture field are available at the output ports of field stores 10 and 20. Sequencer 40 will select lines from field stores 10 and 20 and sequence them to generate a video signal representing the frozen picture. Sequencing circuit 40 may for example, pass all of the lines from field store 10 to generate a first television picture field and then pass all the lines from field store 20 to generate a second field forming an interlaced television video signal. Alternatively, sequencing circuit 40 may alternately pass a single line from field store 10 and a single line from field store 20, to generate a progressive scan television video signal.

Figure 2:
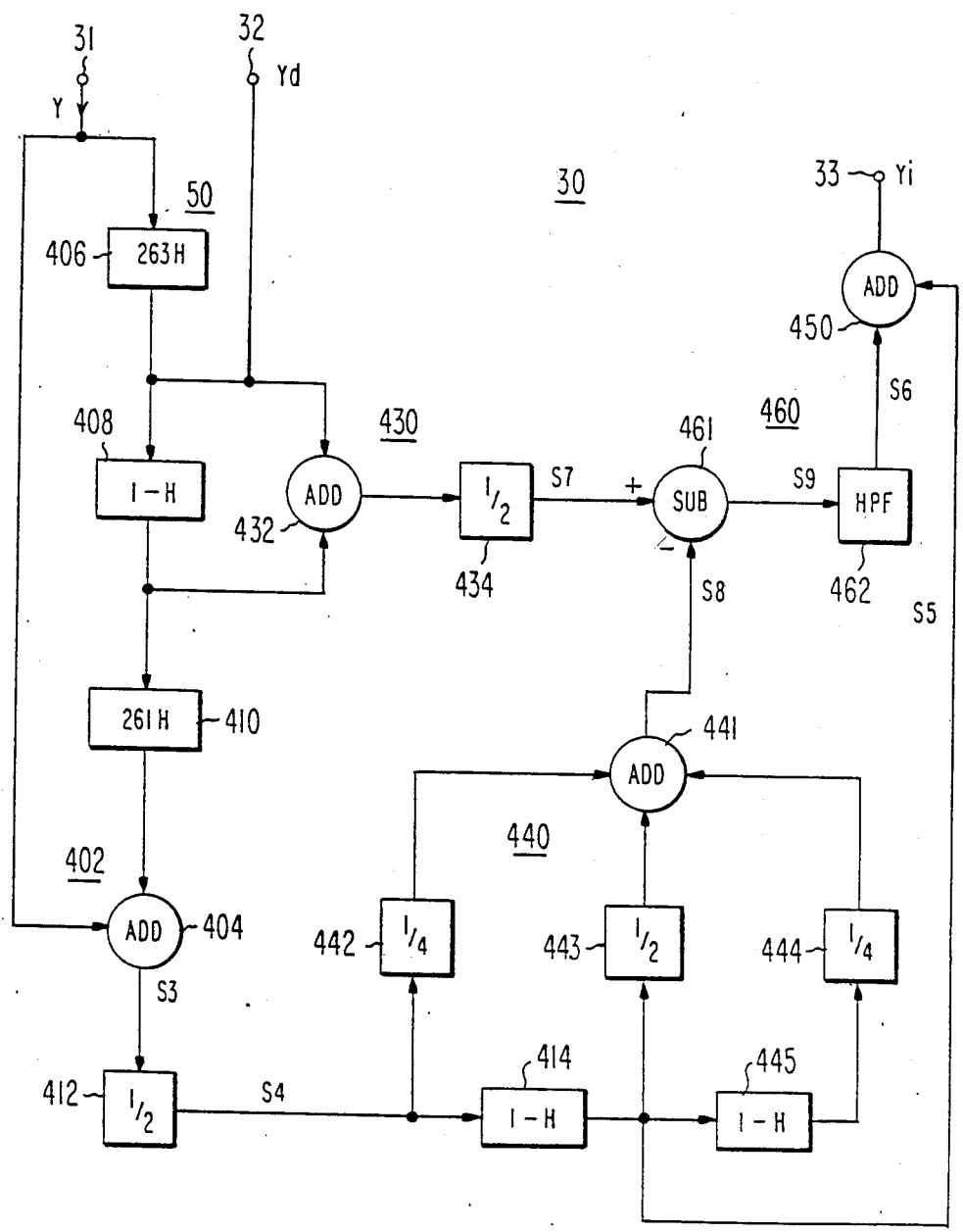
FIG. 2 illustrates an interpolator which may be used in the apparatus as illustrated in FIG. 1.

FIG. 2 illustrates an embodiment of an interpolator 30 which includes an equalizing delay element 50 necessary to ensure proper registration of the interpolated (Yi) and non-interpolated (Yd) signals. In the embodiment illustrated in FIG. 2, the luminance component of a composite video signal has been separated from the chrominance component in an earlier processing step using, for example, standard comb filters of a known type. Similar interpolators could be constructed for the I and Q components of the chrominance portion of the video signal.

The interpolator illustrated in FIG. 2 comprises an input terminal 31 for receiving the luminance signal Y to be interpolated from the video input terminal 5 (of FIG. 1). Input terminal 31 is coupled to the input of a frame averaging circuit (indicated generally as 402) comprising an adder 404 having a first input connected directly to terminal 31 and a second input connected to terminal 31 via a cascade connection of three delay units (406-410) having delays (from terminal 31) of 263 H, 1-H and 261 H where H corresponds to the period of one horizontal line. The total delay is one frame period (525 lines in the NTSC system) and the output signal (S3) from adder 404 represents the sum of pixels one frame apart. This signal (S3) is attenuated by a factor of two in unit 412 to normalize the sum signal and provide an average of the pixels one frame apart. Output signal S4 is an estimate of pixels in the interstitial line in the intervening field.

The delay of the interpolated signal S4 through filter 402 is effectively equal to one-half of the total delays of units 406-410 or 262.5 lines (NTSC assumed). Signal S4 is additionally delayed by a 1-H delay unit 414 to produce a signal S5 having a total delay from input terminal 31 of 263.5 lines.

Signal S5 may include motion artifacts. Because it is the average of two fields, the temporal (motion) resolution is effectively halved. If something moves from field to field the resulting displayed moving object may exhibit serrated edges and smear due to the frame averaging process. The motion artifacts are corrected by a motion compensating signal S6 which is added to signal S5 in adder 450. The motion compensating signal S6 contains an estimate of the temporal resolution missing from the frame interpolated interstitial line. It may be generated in the following manner.

A second estimate of the interstitial line in the intervening field is generated from the average of the vertically adjacent lines within the intervening field. This estimate has full temporal resolution, but has essentially half the vertical resolution. Averaging circuit 430 provides the vertically, intra-field interpolated estimate of the pixels in the interstitial line. Thus, there are two estimates of each such pixel which are spatially and temporally coincident. The frame interpolated estimate has full vertical resolution but essentially half temporal resolution; the vertically interpolated estimate has full temporal resolution but essentially half vertical resolution.

The vertically interpolated estimate contains the temporal resolution missing from the frame interpolated estimate. In order to extract the missing temporal resolution from the vertically interpolated field, it is necessary to equalize the vertical detail. This is done by a further averaging circuit 440 which attenuates the vertical detail of the frame interpolated signal. With vertical detail suppressed in equal amounts in both the frame signal and the vertically averaged signal, the difference between the two signals will accurately represent motion. The difference signal S6, is combined with the frame averaged signal to correct motion artifacts on a continuous basis with no need to change freeze-frame generation as described in the prior art discussed above. Moreover, since the compensating signal removes only motion artifacts, the output signal will still possess the full vertical detail content of the original video input signal.

The first averaging circuit 430 comprises an adder 432 which adds the input and output signals of delay unit 408 and an attenuator 434 which divides the sum by two. The resulting signal S7 represents the average of lines within a field immediately above and below the interpolated line produced by filter 402.

The second averaging circuit 440, which equalizes the vertical detail in the frame averaged estimate of the interstitial line, comprises a three-tap vertical finite impulse response filter having weighting coefficients of 0.25, 0.5 and 0.25. The averaging circuit 440 consists of an adder 441 having a first input coupled via attenuator 442 to the input of delay line 414, a second input coupled to the output of delay line 414 via attenuator 443 and a third input coupled to the output of delay line 445 via attenuator 444.

Averaging circuits 430 and 440 are different structurally. Filter 430 is a "two-tap" filter and filter 440 is a "three-tap" filter. The different filter forms or types are used in order to ensure that the field-delayed vertically interpolated signal S7 is in proper time registration with the frame interpolated and vertically interpolated signal S8. The delay, for each filter is 263.5 lines relative to the video input signal Y. Filter 430 provides a vertically averaged signal S7 with attenuated vertical detail. Averaging circuit 440 provides a frame averaged signal S8 with attenuated vertical detail. The difference between signals S7 and S8 (e.g., signal S9 produced by a subtractor 461 in output circuit 460 e.g., subtractor 461, filter 462 and adder 450) thus represents interframe motion without contamination by vertical detail components of the luma input signal Y.

Although structurally different, the averaging circuits 430 and 440 have been selected to provide transfer characteristics which are nearly matched as to their passband characteristics. Each has a null at an odd multiple of half the line rate of the video input signal. The averaging circuits, accordingly, have similar transfer characteristics and exactly matched temporal characteristics (i.e., signals S7 and S8 are equally delayed).

The difference beteween the transfer characteristics of circuits 430 and 440 includes a residual vertical detail component, which is removed from signal S9 by means of a high pass filter 462 (e.g., 0.5 MHz) which supplies the motion correction signal S6 to adder 450 in output circuit 460.

The interpolated luminance signal Yi, from output terminal 33, is coupled to field store 20 of FIG. 1. The delayed luminance signal Yd, from output terminal 32 corresponds in time to signal Yi and is coupled to field store 10 of FIG. 1. When these two fields are displayed together, a picture with reduced motion artifacts and full vertical resolution results.

Figure 3:
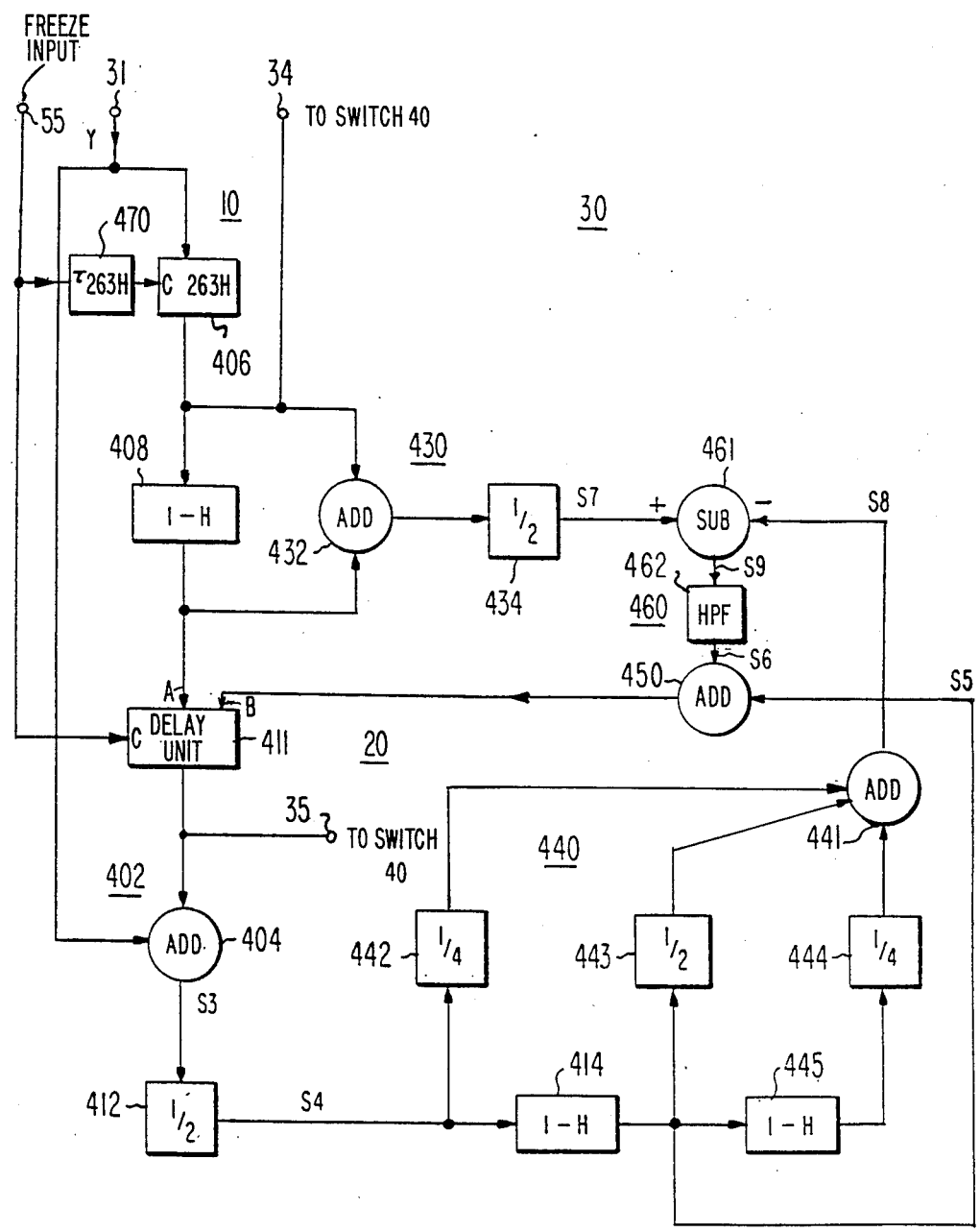
FIG. 3 illustrates an alternate embodiment of an interpolator which may be used in the apparatus illustrated in FIG. 1.

FIG. 3 illustrates an alternate embodiment of a freeze frame apparatus illustrated in FIG. 1. The apparatus of FIG. 3 includes field stores 10 and 20, and interpolator 30. The elements in FIG. 3 which are similar to those in FIG. 2 are identified with the same reference numbers, operate in the same manner, and are not discussed in detail below.

In FIG. 3, the interpolator illustrated in FIG. 2 is modified in the following manner. The output of delay unit 408 is coupled to a first input A of a delay unit 411. The output of adder 450 is coupled to a second input B of delay unit 411. Delay units 406 and 411 both consist of read/write memories and associated circuitry to control addressing, reading from, and writing to the memories.

The output of delay unit 406 is coupled to an output terminal 34, which is coupled to an input terminal of sequencing unit 40 of FIG. 1. The output of delay unit 411 is coupled to an output terminal 35, which is coupled to another input terminal of sequencing unit 40 of FIG. 1. Freeze input terminal 55 is coupled to an input port of a delay unit 470 and a control input terminal of delay unit 411. The output port of delay unit 470 is coupled to a control input terminal of delay unit 406.

In operation, delay unit 406 also functions as field store 10. During normal operations, the read/write memory in delay unit 406 functions in a read-then-write mode. That is, the address of the location containing the pixel which is delayed 263 line intervals relative to the input video signal Y is generated and applied to the read/write memory. That pixel is then read from the addressed location in the memory and supplied to adder 432 and delay unit 408. The latest pixel from input terminal 31 is then written into the same location and the cycle is repeated. When the delayed freeze input signal is received from delay unit 470, delay unit 406 is conditioned to recirculate the data previously stored in it. In this mode of operation, writing to the memory is inhibited. Instead, addresses are generated in the normal manner, but only read operations are performed. The delayed information is available at output terminal 34, which is coupled to one pole of switch 40 of FIG. 1.

Delay unit 411 functions as field store 20. Delay unit 411 includes a memory capable of storing 263 horizontal lines of information. During normal operations, delay unit 411 operates in a modified read-then-write mode. The address of the location containing the pixel delayed 261 horizontal line intervals relative to input terminal A is generated and applied to the read/write memory. The pixel at the addressed location is read from the memory and supplied to adder 404. Then the address of the location containing the pixel delayed by 263 horizontal line intervals relative to input terminal A is generated and applied to the memory. The pixel at input terminal A is written into the addressed location, and the cycle is repeated. At any time, the memory contains information from the previous 263 horizontal lines.

When a freeze input signal is received from input terminal 55, delay unit 411 begins a sequence of two operational modes. In the first mode, pixels delayed 261 horizontal lines relative to input terminal A are read from the memory and supplied to adder 404. However, the pixels in memory which are delayed 263 horizontal line intervals relative to input terminal A are overwritten by pixels from input terminal B, which represent the motion compensated estimated interstitial lines. For the next 263 horizontal line intervals, adder 404 receives the delayed pixels it requires to properly perform its averaging. In addition, delay unit 411 stores 263 horizontal lines of motion compensated estimated interstitial lines. At the end of 263 horizontal line intervals, delay unit 411 contains a field of motion compensated estimated interstitial lines.

The second mode of operation is the repetitive read only mode. In this mode, writing into the memory is inhibited. Instead, addresses are generated in the normal manner, but only read operations are performed.

Apparatus according to the present invention may be implemented in either continuous or sampled data form. Sampled data implementations may be in either digital or analog form.

What is claimed is:

1. A method of freezing a television picture comprising the steps of:
   storing one of successive fields of at least one component of an input video signal;
   generating successive fields of motion compensated frame averaged interstitial lines from said input video signal;
   storing one of said successive fields of interstitial lines which correspond to said stored field of said input video signal;
   repetitively sequencing lines from said stored fields of said input video signal and interstitial lines to form a video signal representing a frozen television picture.

2. The method of claim 1, wherein said sequencing step comprises the steps of:
   selecting a line from said stored input video signal field for inclusion in said video signal; then
   selecting a line from said stored generated field for inclusion in said video signal; and
   repeating the above two steps for successive lines in said stored input video and motion compensated fields to form a progressive scan video signal.

3. The method of claim 1, wherein said sequencing step comprises the steps of:
   selecting successive lines from said stored input video field for inclusion in said video signal; then
   selecting successive lines from said stored generated field for inclusion in said video signal; and
   repeating the above two steps to form an interlaced video signal.

4. The method of claim 1, wherein said generating step comprises the steps of:
   frame averaging said input video signal to form a signal possibly including motion artifacts;
   vertically averaging said frame averaged signal to attenuate vertical detail;
   vertically averaging a field delayed input video signal to attenuate vertical detail;
   combining the results of the above three steps to generate a motion compensated, frame interpolated video signal.

5. Apparatus for freezing a television picture comprising:
   a source of an input video signal representing said television picture;
   first means coupled to said source for storing a field of said television picture;
   means coupled to said source for generating successive fields of motion compensated frame interpolated interstitial lines;
   second means coupled to said generating means for storing said generated field;
   means coupled to said first and second storing means for repetitively sequencing lines from said stored input video and motion compensated fields to form a video signal representing a frozen television picture.

6. The apparatus of claim 5, wherein said field generating means comprises:
   input means coupled to said source;
   first averaging means coupled to said input means for providing a frame averaged output signal tending to exhibit motion artifacts;
   second averaging means coupled to said input means for providing a vertically averaged output signal having picture elements spatially and temporally coincident with corresponding picture elements of said frame averaged video output signal and having a vertical detail component suppressed by a given amount;
   third averaging means coupled to said first averaging means for attenuating a vertical detail component of said frame averaged video output signal by substantially said given amount to provide a further video output signal; and
   output means for combining the video output signals of said first, second and third averaging means for providing a motion compensated frame interpolated video output signal.

* * * * *